(12) United States Patent
Swinford

(10) Patent No.: US 6,776,186 B2
(45) Date of Patent: Aug. 17, 2004

(54) DISPENSING TOOL FOR EVACUATING AND CHARGING A FLUID SYSTEM

(75) Inventor: Mark D. Swinford, Dayton, OH (US)

(73) Assignee: Machine Design Specialists, Inc., Dayton, OH (US)

( * ) Notice: Subject to any disclaimer, the term of this patent is extended or adjusted under 35 U.S.C. 154(b) by 284 days.

(21) Appl. No.: 10/165,499

(22) Filed: Jun. 7, 2002

(65) Prior Publication Data

US 2003/0226598 A1 Dec. 11, 2003

(51) Int. Cl.$^7$ ................................................ E03C 1/00
(52) U.S. Cl. ...................................... 137/614; 137/605
(58) Field of Search ............................ 137/614, 614.03, 137/614.04, 614.05, 637, 594, 605, 602, 606

(56) References Cited

U.S. PATENT DOCUMENTS

| | | | |
|---|---|---|---|
| 2,887,124 A | | 5/1959 | Mehl |
| 3,825,223 A | * | 7/1974 | Richardson ............... 251/149.6 |
| 4,708,175 A | | 11/1987 | Janashak et al. |
| 4,805,417 A | | 2/1989 | Weaver et al. |
| 4,889,149 A | | 12/1989 | Weaver et al. |
| 4,917,156 A | | 4/1990 | Varlet |
| 5,080,132 A | * | 1/1992 | Manz et al. ............ 137/614.04 |
| 5,244,010 A | * | 9/1993 | Barjasteh et al. ....... 137/614.05 |
| RE34,715 E | | 9/1994 | Gudenau et al. |
| 5,349,998 A | | 9/1994 | Gonfiantini |
| 5,450,875 A | * | 9/1995 | Chichester et al. ..... 137/614.05 |
| 5,560,407 A | | 10/1996 | Swinford |
| 6,029,720 A | | 2/2000 | Swinford |
| 6,257,285 B1 | | 7/2001 | Robinson et al. |
| 6,298,886 B1 | | 10/2001 | Robinson et al. |
| 6,539,970 B1 | * | 4/2003 | Knowles et al. ............ 137/614 |

* cited by examiner

Primary Examiner—Kevin Lee
(74) Attorney, Agent, or Firm—Stevens & Showalter LLP

(57) ABSTRACT

A tool assembly for connection to a charging inlet tube of a fluid receiving system, and for evacuating and dispensing a charging fluid to the fluid receiving system. The tool assembly includes a tool housing having an upper and a lower housing half and including a plurality of internal valve components. The internal valve components are assembled in sliding engagement with each other within the tool housing and are held in assembled engagement by assembly of the upper and lower housing halves together whereby the tool assembly may be quickly disassembled and assembled for replacement of components. Fluid flow through the tool assembly is directed by an inner body positioned between the upper and lower housing halves, and vacuum and fluid charging is controlled by a vacuum control poppet and fluid control poppet, respectively, which poppets are longitudinally moveable relative to the inner body and to each other. The fluid is discharged from the tool assembly at a charge gate, and a stem member extends through the charge gate for actuating a valve within the inlet tube. The stem member directly engages the charge gate in order to provide for accurate control of the travel distance of the stem member.

15 Claims, 12 Drawing Sheets

DISPENSING TOOL FOR EVACUATING AND CHARGING A FLUID SYSTEM

BACKGROUND OF THE INVENTION

1. Field of the Invention

The present invention relates to devices for use in dispensing fluids to a fluid system and, more particularly, to a device for evacuating and dispensing a fluid to a system, such as a charging fluid to a refrigeration or air conditioning system.

2. Related Prior Art

In motor vehicle production lines, the vehicle air conditioning system is typically evacuated and filled at a charging port of the system. In order to facilitate the charging of the system, a tool is provided which is moved into engagement with the port and which opens a Schrader valve on the port. The port is alternately subjected to vacuum to substantially eliminate air from the system and subjected to a pressurized charging fluid for filling the system with a refrigerant.

It should be noted that in prior art tools, multiple parts forming the internal valve elements for the tool are stacked together and are held in position by bolts extending between the various valve elements, including bolts extending both in the axial and radial direction relative to the axis of the tool. This can lead to a time consuming overhaul process which can be undesirable in mass production assembly lines. In addition, such prior art tools include an element for actuating a Schrader valve wherein the actuating element is limited in movement toward the Schrader valve. However, the stop for the actuating element is often located on an internal valve element which is displaced from the Schrader valve by several other valve members, i.e., by the multiple parts forming the stacked internal valve elements, such that the combined tolerances of these members can result in a wide variation of travel for the actuating element between different tools. This can have a detrimental effect on the operation of the tool in that the actuating element may in some cases be overextended, resulting in damage to the Schrader valve, or in other cases, the actuating element will not extend to the point of fully opening the Schrader valve and thus limit the flow capacity through the tool.

It is generally desirable in a high volume vehicle production line to provide a fitting which may be quickly attached to the port by an automatic mechanism, and which will also evacuate and fill the system to be charged at a high rate. Accordingly, it is desirable to have a dispensing tool which is of simple and reliable construction in order to insure repeated performance on successive vehicles while minimizing maintenance on the tool. Further, it is desirable to provide a tool which provides for high vacuum and charging fluid flow rates through the tool in order to minimize the amount of time that the tool must remain attached to the vehicle. It is also desirable to have a tool which is easily disassembled and assembled by maintenance workers responsible for maintaining operation of the tool.

SUMMARY OF THE INVENTION

In accordance with the present invention, a tool assembly is provided for dispensing fluid to a fluid receiving system having a charging inlet tube, and typically including a Schrader valve for controlling flow of fluids into and out of the fluid receiving system. The tool assembly includes a tool housing having an upper housing half and a lower housing half, and enclosing a plurality of internal valve elements.

The lower housing half includes a lower end, and a clamp assembly is located at the lower end including radially moveable clamp members for coupling the tool assembly to a charging inlet tube for a fluid receiving system. The upper housing half includes an upper end defining a plurality of openings for selectively admitting fluids to an interior portion of the housing, and the plurality of valve elements are assembled in axially slidable engagement with each other within the upper and lower housing halves for controlling flow of fluids through the interior portion of the housing.

In accordance with one aspect of the invention, the upper and lower halves are connected to each other at connector portions of the upper and lower housing halves wherein engagement of the connector portions with each other closes the housing to maintain each of the valve elements in operable relation to other ones of the valve elements.

One of the plurality of valve elements comprises an inner body located in stationary relationship relative to the upper and lower housing halves, and the inner body includes passages for controlling flow of vacuum and a charging fluid, which fluid flows are provided to the assembly through the openings in the upper end of the upper housing half. The inner body defines a cavity for receiving a fluid control poppet, and the fluid control poppet includes a hollow cylindrical portion receiving a cylindrical portion of a vacuum control poppet therein. The fluid control poppet and vacuum control poppet are supported for longitudinal movement in an axial direction relative to the inner body and relative to each other for controlling flow of vacuum and flow of charging fluid through the tool assembly.

The inner body additionally defines a vacuum control air passage for controlling air to an area between the fluid control poppet and vacuum control poppet whereby the vacuum control poppet is actuated for movement to open a vacuum passage to the charging inlet tube.

In one embodiment of the invention, the clamp assembly includes a clamp cylinder having a plurality of radially extending apertures wherein each aperture in the clamp cylinder includes a piston which is radially moveable for biasing respective clamp balls radially inwardly into engagement with the charging inlet tube in order to clamp the assembly to the charging inlet tube. The clamp balls are supported in a charge gate cylinder which is positioned within the clamp assembly. The charge gate cylinder comprises an upper cavity and a lower cavity and a charge gate located between the upper and lower cavities and defining a passage for fluid between the tool housing and the charging inlet tube.

An elongated stem member is supported for longitudinal movement through the tool housing and includes an upper portion and a lower portion. The stem member extends through the vacuum control poppet, and the lower portion of the stem member extends through the charge gate for engagement with a Schrader valve. The stem member includes s shoulder adjacent to the lower portion for engaging against the charge gate for limiting movement of the stem member in a direction from the upper housing half toward the lower housing half. The stem member is actuated for movement by air pressure provided at a stem port located centrally of the upper housing half and applying air pressure to the upper portion of the stem member.

DETAILED DESCRIPTION OF THE PREFERRED EMBODIMENT

Figure 1:
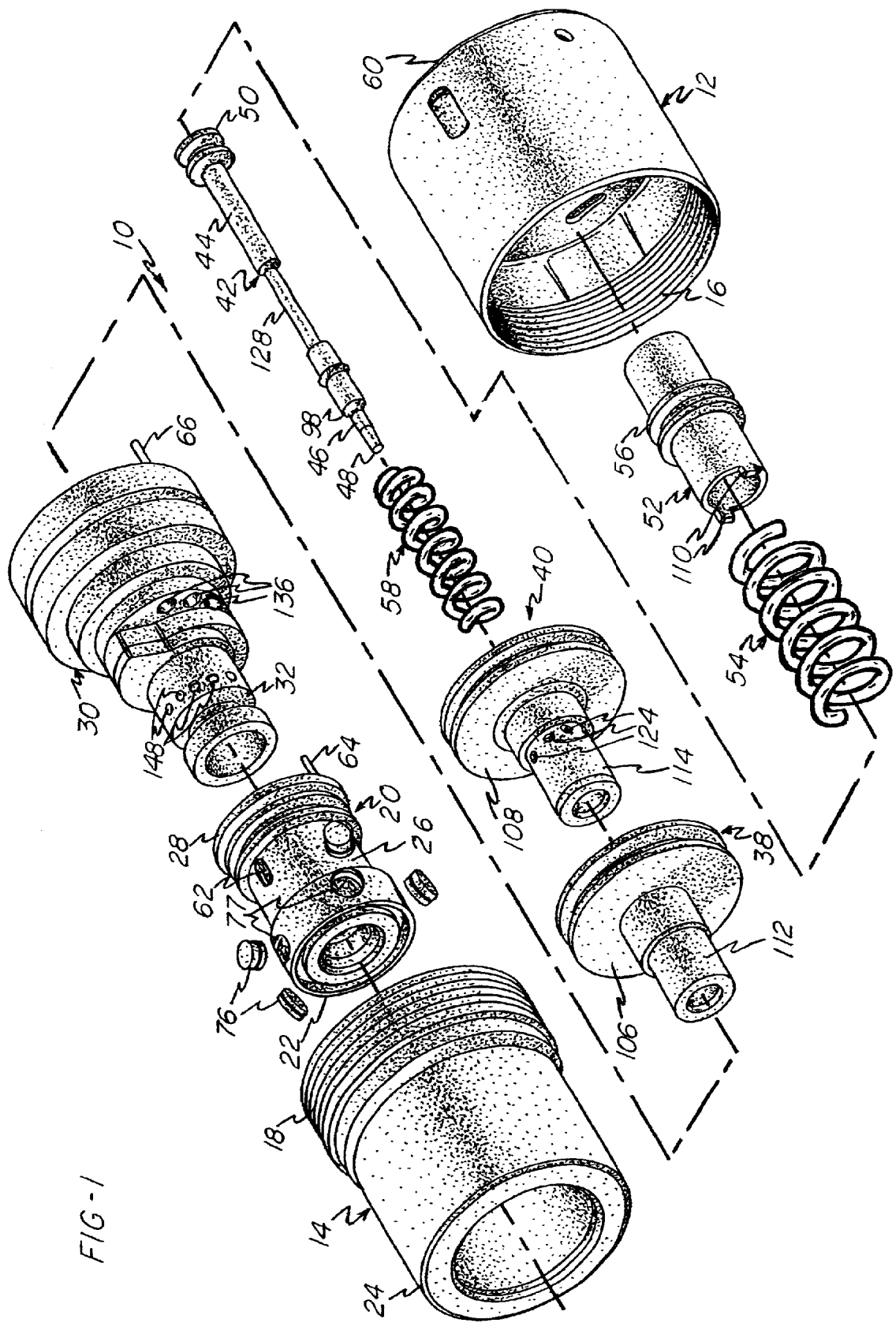
FIG. 1 is an exploded perspective view of the tool assembly of the present invention.
Figure 2:
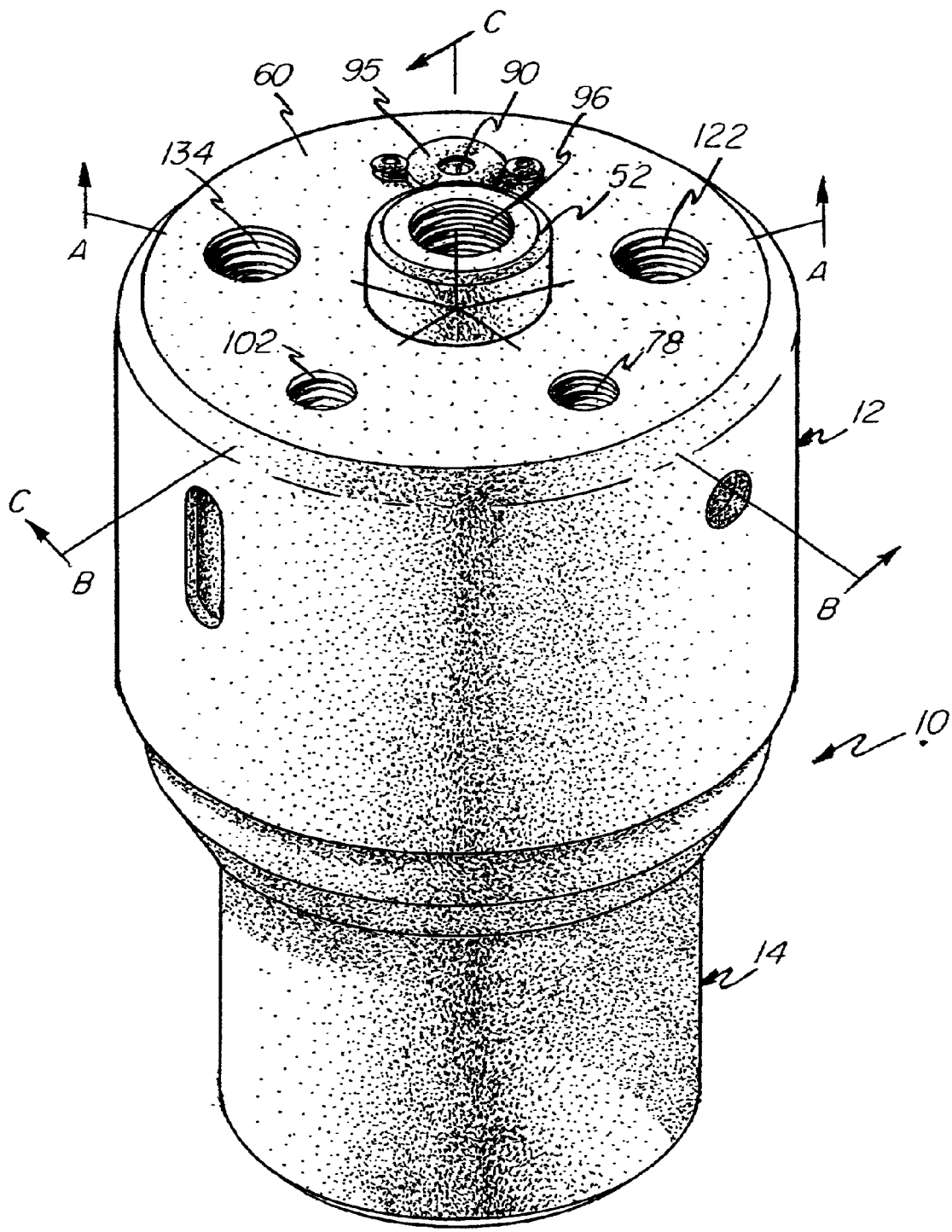
FIG. 2 is a top perspective view of the tool assembly.

Referring to FIGS. 1 and 2, the tool assembly of the present invention includes a tool housing 10 comprising an upper housing half 12 and a lower housing half 14. The upper housing half 12 includes an upper connector portion 16, and the lower housing half 14 includes a lower connector portion 18 wherein the upper and lower connector portions 16, 18 of the illustrated embodiment comprises threaded portions for cooperating with each other whereby the cooperation of the threaded connector portions 16, 18 forms a fully enclosed housing 10 as will be discussed further below.

A charge gate assembly 20 is positioned within the lower housing half 14 and includes a lower end 22 located adjacent a lower end 24 of the lower housing half 14. The charge gate assembly includes a clamp assembly 26 and a charge gate cylinder 28 extending within the clamp assembly 26.

Figure 5:
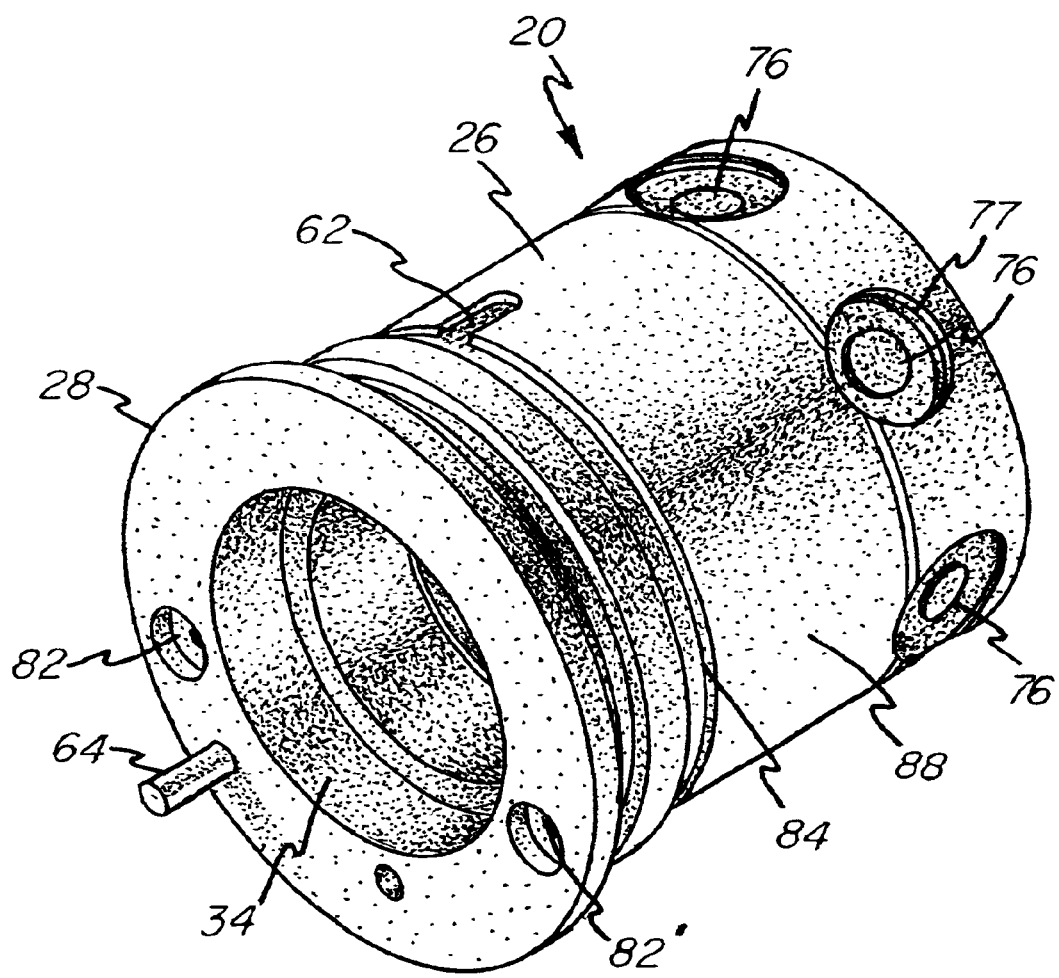
FIG. 5 is a perspective view of the charge gate assembly.
Figure 6:
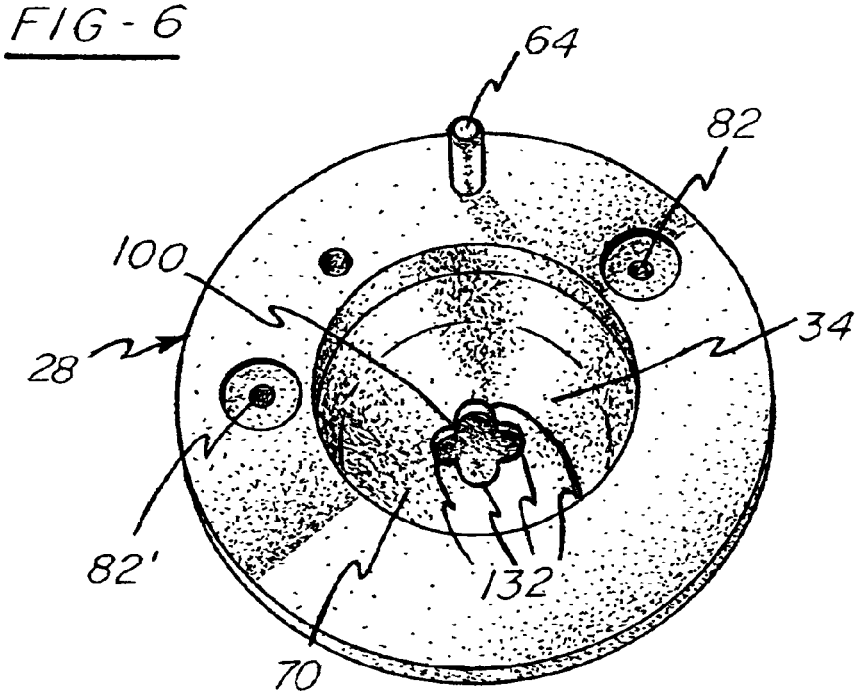
FIG. 6 is a top perspective view of the charge gate cylinder.

An inner body 30 is located above the charge gate assembly 20 and includes a lower extension 32 extending into an upper cavity 34 (FIGS. 5 and 6) of the charge gate assembly 20. The inner body 30 includes an interior cavity 36 (FIG. 3) receiving a fluid control poppet 38 and a vacuum control poppet 40 therein. A stem member 42 is provided extending through the vacuum control poppet 40 and passing to a location adjacent the lower end 22 of the charge gate assembly 20, and includes an upper portion 44 and a lower portion 46 wherein the lower portion 46 includes an end 48 for engaging and actuating a Schrader valve on a charging inlet tube for a fluid receiving system. An enlarged upper end 50 of the stem member 42 extends into a stem port 52 which is positioned through a central opening of the upper housing half 12.

A spring 54 is provided extending between a flange 56 on the stem port 52 and the vacuum control poppet 40 for biasing the vacuum control poppet downwardly toward the inner body 30. Further, a spring 58 is provided engaging a lower surface of the enlarged head 50 of the stem member 42 and engaging the vacuum control poppet 40 for biasing the stem member 42 in a direction toward an upper end 60 of the upper housing half 12.

It should be noted that the charge gate assembly 20, inner body 30, fluid control poppet 38, vacuum control poppet 40 and stem member 42 all comprise internal valve elements, and that these internal valve elements are assembled in sliding engagement with each other. In order to facilitate alignment in a circumferential direction, an alignment dowel pin 62 is located between the clamp e assembly 26 and the charge gate cylinder 28, an alignment dowel pin 64 is located between the charge gate assembly 20 and the inner body 30, and an alignment dowel pin 66 is located between the inner body 30 and an interior surface of the upper end 60 of the upper housing half 12. The alignment dowel pins 62, 64, 66 insure alignment of fluid passages through the internal valve elements while permitting slidable assembly of the internal valve elements.

Figure 7:
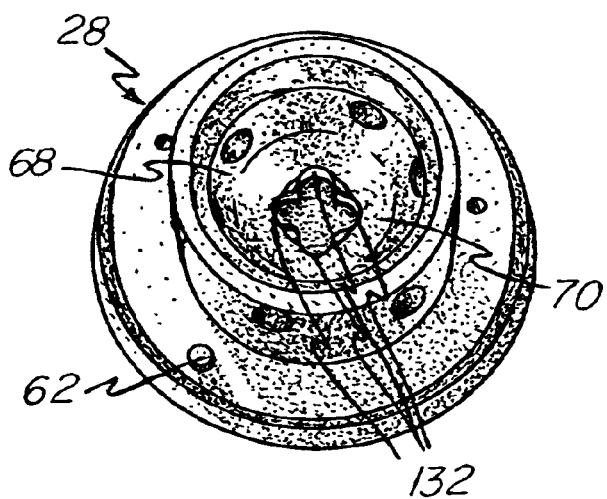
FIG. 7 is a bottom perspective view of the charge gate cylinder.
Figure 8:
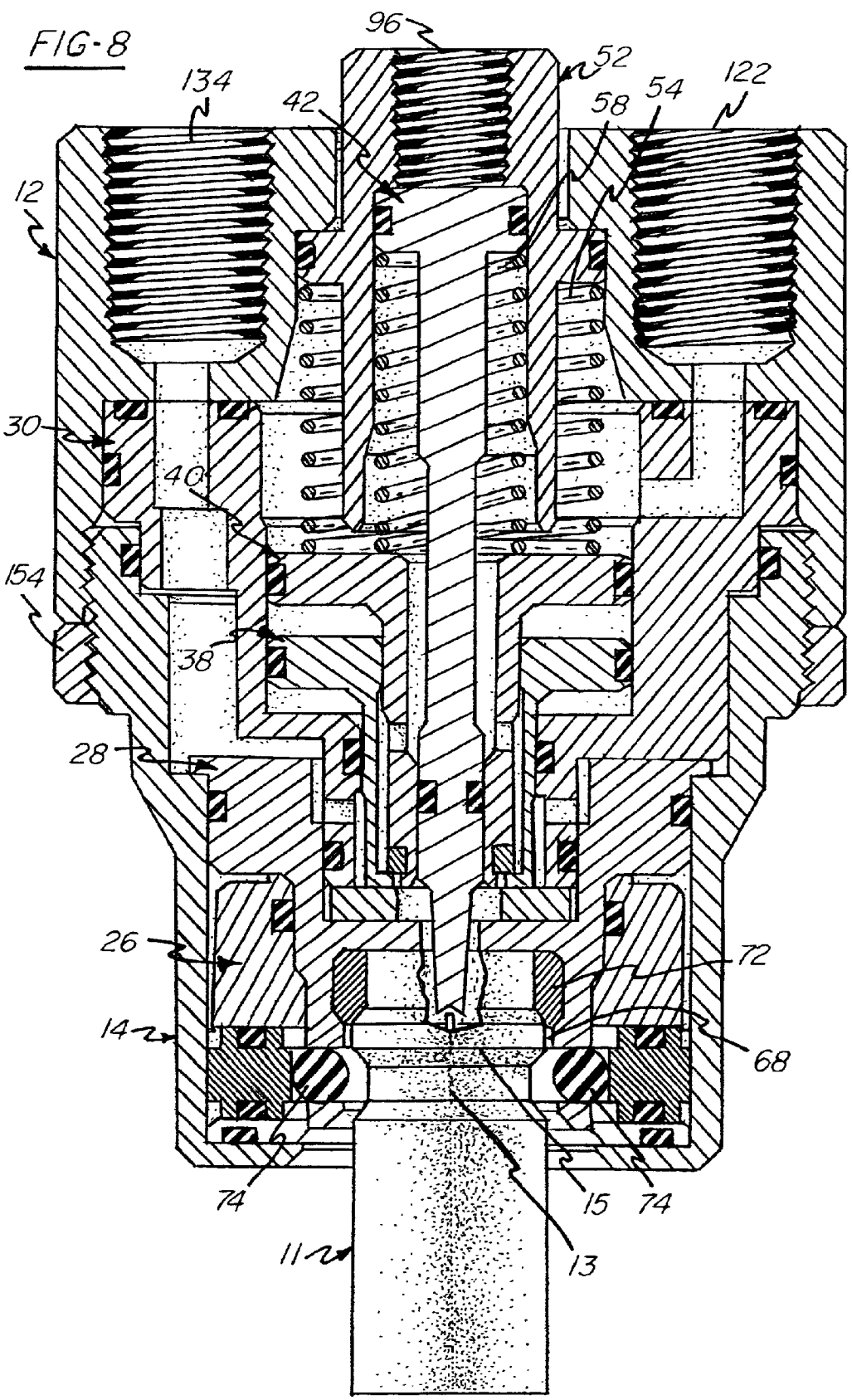
FIG. 8 is a cross sectional view taken along line A—A in FIG. 2 showing the tool assembly in an unclamped position.

Referring to FIG. 8, the tool assembly 10 is illustrated in an unclamped position wherein the tool assembly is illustrated located over a charging inlet tube 11 having a circumferential fitting groove 13 formed adjacent an end 15 thereof. The end 15 of the inlet tube 11 is located within a lower cavity 68 of the charge gate cylinder 28 below a charge gate 70 (see also FIG. 7) and in engagement with a resilient sealing member 72. In the position illustrated, a plurality of clamp balls 74, supported within radially extending apertures formed in the charge gate cylinder 28, are located adjacent to, but not engaged in, the groove 13.

Figure 9:
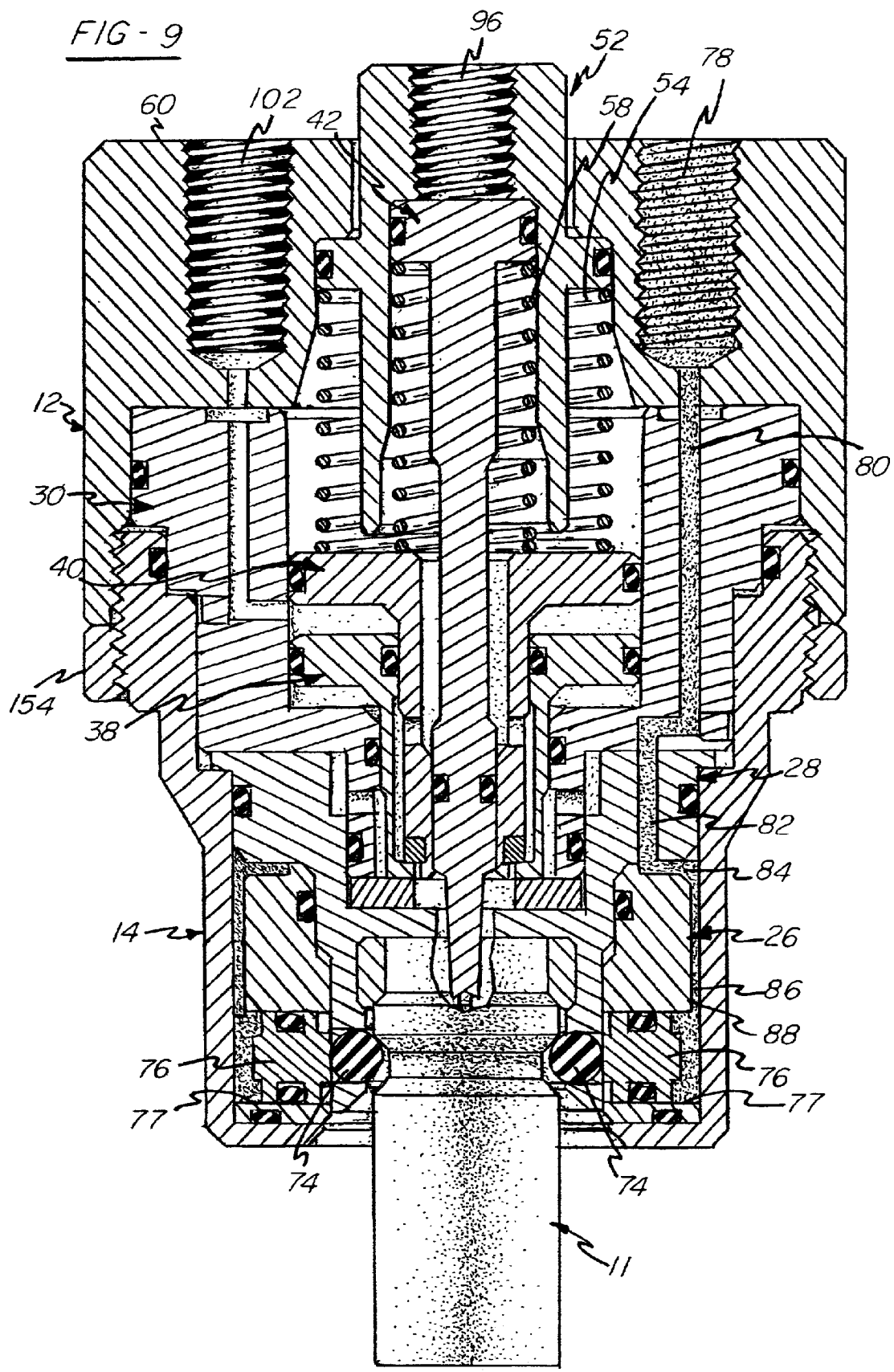
FIG. 9 is a cross sectional view taken along line B—B in FIG. 2 showing the tool assembly in a clamped position.

Referring to FIG. 9, the tool assembly 10 is clamped to the inlet tube 11 by means of air actuation wherein an air pressure acts upon a plurality of pistons 76 supported for radial movement within apertures 77 (FIG. 1) formed in the clamp assembly 26 which are aligned with and act upon respective clamp balls 74 to push the balls 74 into engagement with the groove 13. The air pressure for actuating the cylinders 76 is provided by a clamp control air passage extending from the upper housing half 12 to the pistons 76, as illustrated by heavy stipling. Specifically, the upper end 60 of the upper housing half 12 is provided with a clamp control air port 78 (FIG. 2) which is aligned with a clamp control air passage 80 formed in the inner body 30 (see also FIGS. 3 and 4). An outlet of the clamp control air passage 80 at the bottom of the inner body 30 is aligned with a clamp control air passage 82 formed in the charge gate cylinder 28, and the passage 82 opens into a gap 84 formed between adjacent surfaces of the charge gate cylinder 28 and the clamp assembly 26. The gap 84 is in fluid communication with a gap 86 defined between an outer surface 88 of the clamp assembly 26 (FIG. 5) and an inner surface of the lower housing half 14. The gap 86 is in fluid communication with the apertures 77 containing the pistons 76.

Figure 10:
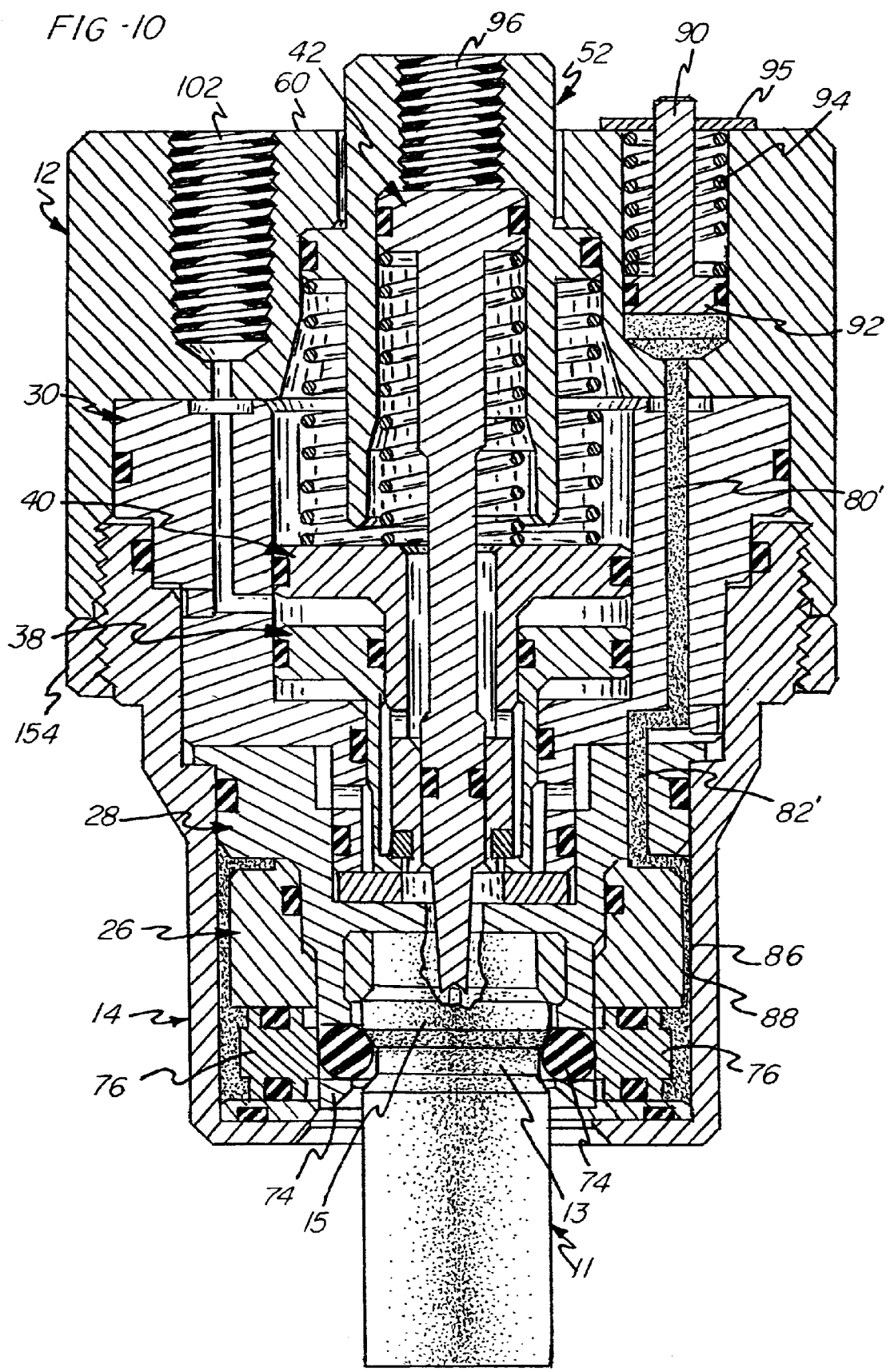
FIG. 10 is a cross sectional view taken along line C—C in FIG. 2 showing the clamp signal flag.

Referring to FIG. 10, it should be noted that an additional clamp control air passage is provided extending from the area of the gap 84 up to a signal flag 90 at the upper end 60 of the upper housing half 12. The additional clamp control air passage comprises a passage 80' formed in the inner body 30 and a passage 82' formed in the charge gate cylinder 28 wherein the passages 80' and 82' are substantially identical to the passages 80 and 82 for providing pressurized air from the port 78. The passages 80', 82' convey air to the signal flag 90 whereby air acting on a lower piston end 92 of the signal flag 90, causes the signal flag 90 to extend from the upper end 60 of the upper housing half 12 and thereby indicate that the clamp assembly 26 has been actuated to clamp onto the inlet tube 11. The signal flag 90 further includes a spring 94 acting against a cover plate 95 to bias the signal flag back into the upper housing half 12 when the clamp control air is deactivated.

Figure 11:
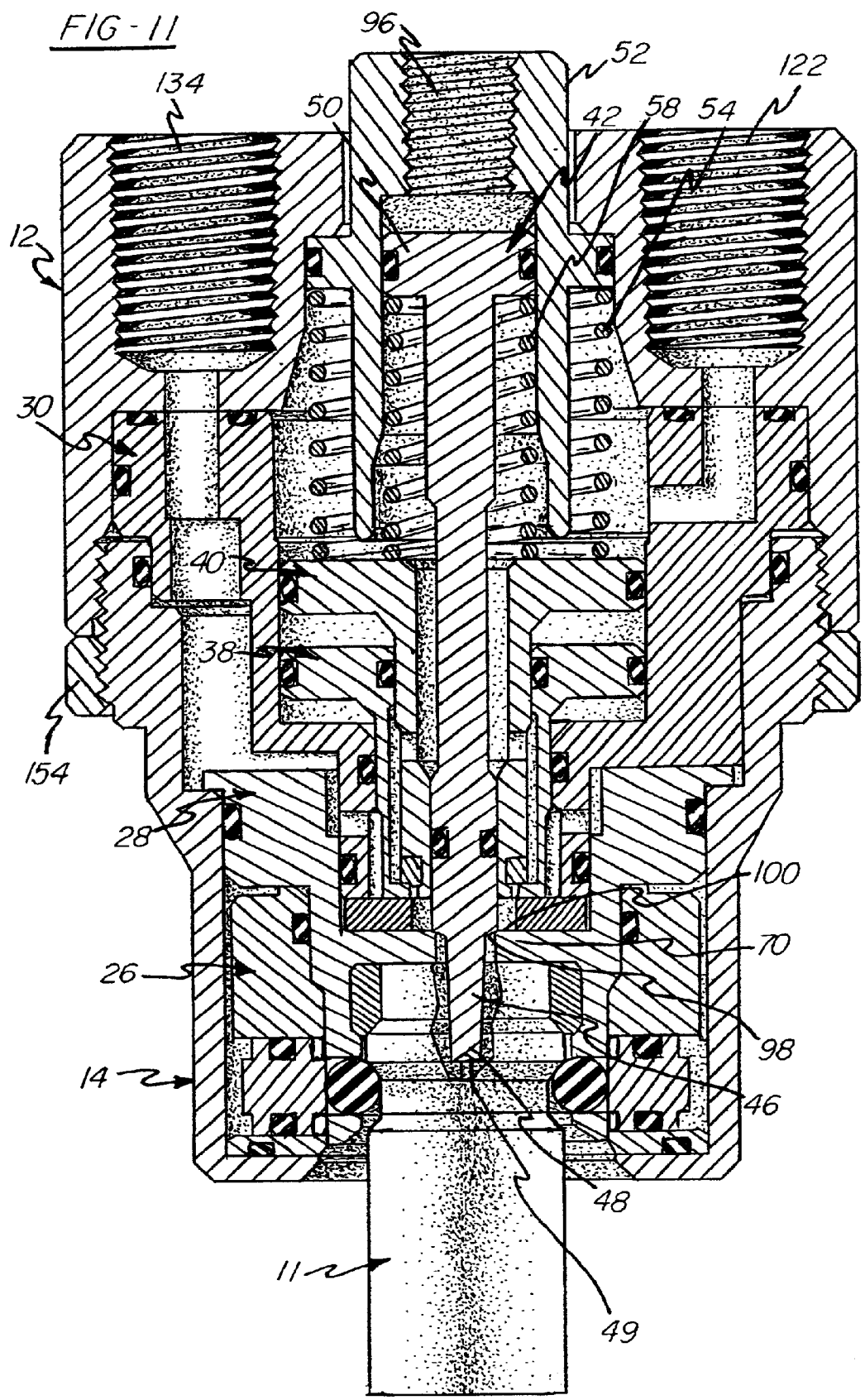
FIG. 11 is a cross sectional view taken along line A—A in FIG. 2 showing the stem member of the tool assembly in an actuated position.

Referring to FIG. 11, the stem member 42 is actuated in longitudinal movement downwardly by application of stem member actuation air (illustrated by heavy stipling) to an opening 96 at an upper end of the stem port 52 wherein the stem member 42 is caused to move against the biasing force of the spring 58 and moves from the position shown in FIG. 9 to that shown in FIG. 11. Actuation of the stem member 42 causes the end 48 thereof to move into engagement with a Schrader valve element 49 in order to open the Schrader valve located in the inlet tube 11.

The stem member 42 is formed with a shoulder portion 98 which extends radially outwardly from a diameter of the lower portion 46 of the stem member 42. The shoulder portion 98 engages against an upper surface area 100 of the charge gate 70 to thereby limit movement of the stem member 42 toward the Schrader valve of the inlet tube 11. It should be noted that the travel of the stem member 42 is capable of being highly accurately controlled by controlled machining of the distance between the shoulder portion 98 and the end 48 of the stem member 42. Further, it should be noted that this controlled tolerance is provided in combination with engagement of the shoulder portion 98 on the same component as is used to position the tool assembly relative to the inlet tube 11, i.e., the charge gate cylinder 28. Thus, accurate control of the travel distance of the stem member 42 is provided to accurately control opening of the Schrader valve in the inlet tube 11 and thereby both avoid over-actuation and possible damage of the Schrader valve, while also insuring full opening of the Schrader valve.

Figure 12:
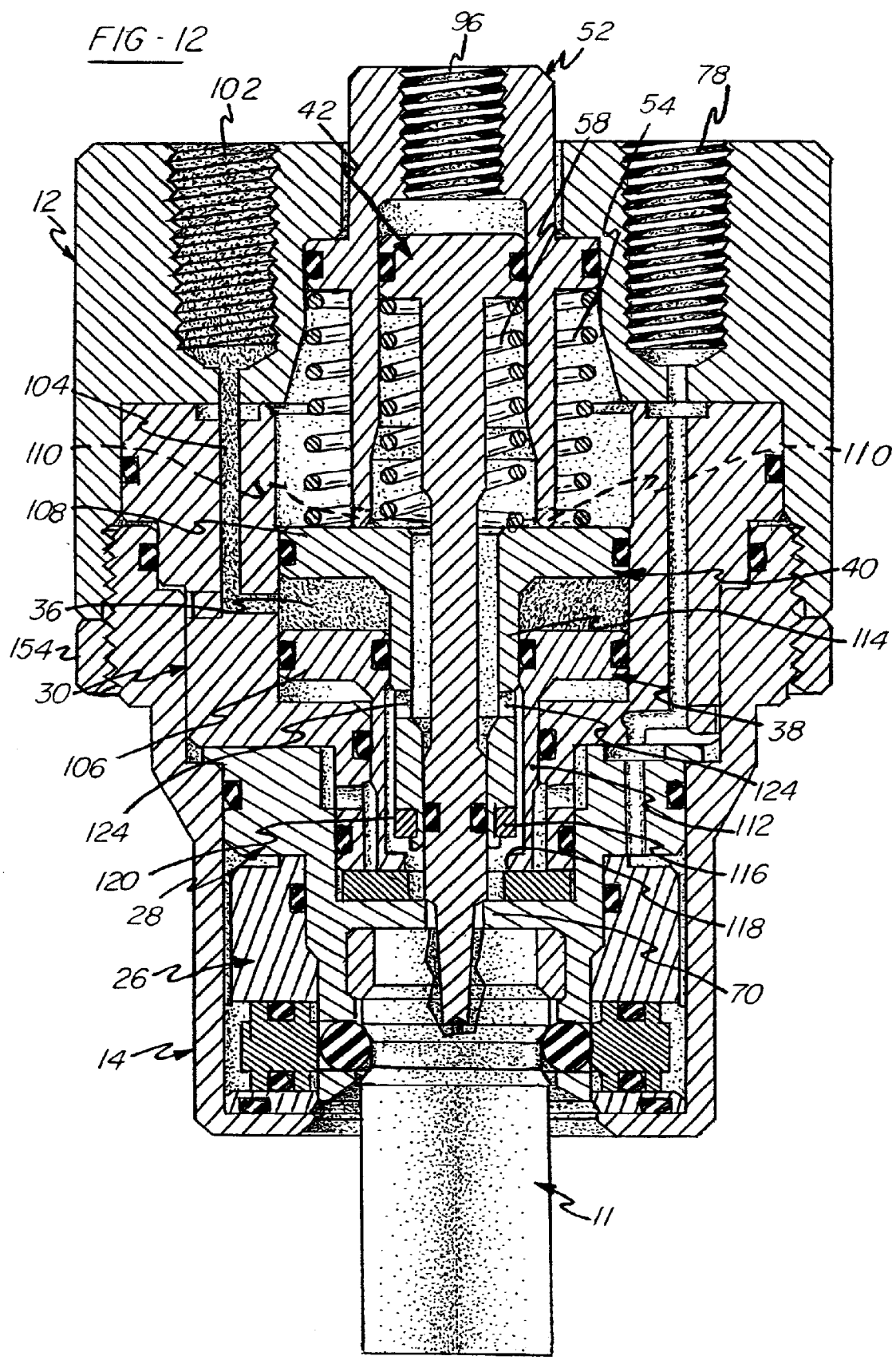
FIG. 12 is a cross sectional view taken along line B—B in FIG. 2 showing actuation of the vacuum control poppet.

Referring to FIG. 12, a vacuum control air passage extends from a port 102 (see also FIG. 2) in the upper end 60 of the upper housing half 12 to a passage 104 formed in the inner body 30. The passage 104 extends to the interior cavity 36 of the inner body 30 at a location between a radially extending flange 106 of the fluid control poppet 38 and a radially extending flange 108 of the vacuum control poppet 40. When air pressure is applied to the port 102 (as illustrated by heavy stipling), it causes the vacuum control poppet 40 to move upwardly into engagement with a pair of spacing tabs 110 (see FIG. 1) located on the bottom of the stem port 52, against the biasing force of the spring 54.

It should be noted that upward movement of the vacuum control poppet 40 causes a cylindrical body 114 of the vacuum control poppet 40 to move relative to a cylindrical body 112 of the fluid control poppet 38 whereby a seal 116 at a lower end of the cylindrical body 114 moves out of engagement with a lower end 118 of the cylindrical body 112 to thereby open a passage to the charge gate 70 from a cavity 120 located between the cylindrical bodies 112, 114.

Figure 13:
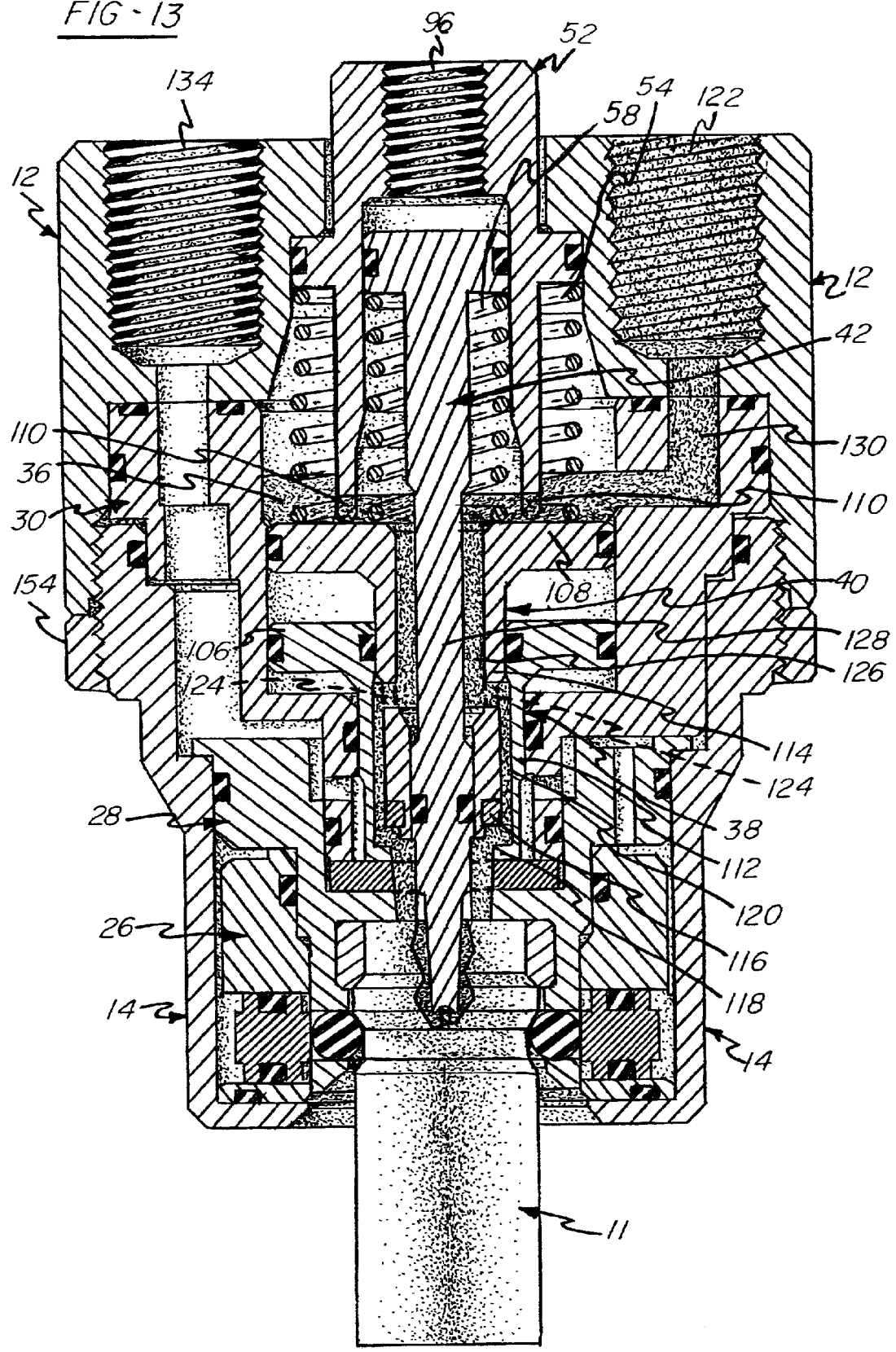
FIG. 13 is a cross sectional view taken along line A—A in FIG. 2 showing actuation of vacuum to remove air from a fluid receiving system.

Referring further to FIG. 13, the cavity 120 between the cylindrical bodies 112, 114 is connected to a vacuum port 122 at the upper end 60 of the upper housing half 12 through a plurality of radially extending apertures 124 formed in the cylindrical body 114. In addition, the vacuum is communicated through a gap 126 formed between a reduced portion 128 of the stem member 42 and the interior of the cylindrical body 114, and passes through an area above the flange 108 in the interior cavity 36 of the inner body 30, and connected to the port 122 through a vacuum passage 130 formed in the inner body 30 (see also FIG. 3). It should be understood that the spacing tabs 110 permit fluid communication between the inner and outer portions of the stem port 52 across the upper surface of the flange 108. Further, it should be noted that fluid flow through the charge gate 70 is provided at arcuate portions 132 (see FIGS. 6 and 7) forming openings around the surface area 100 of the charge gate engaged by the shoulder portion 98 of the stem member 42.

After vacuum is applied to the port 122 for a predetermined amount of time, whereby a fluid receiving system associated with the inlet tube 11 is evacuated, the vacuum control air pressure applied to port 102 is deactivated whereby the spring 54 will cause the vacuum control poppet 40 to return downwardly for engagement of the seal 116 with the end 118 of the cylindrical body 112.

Figure 3:
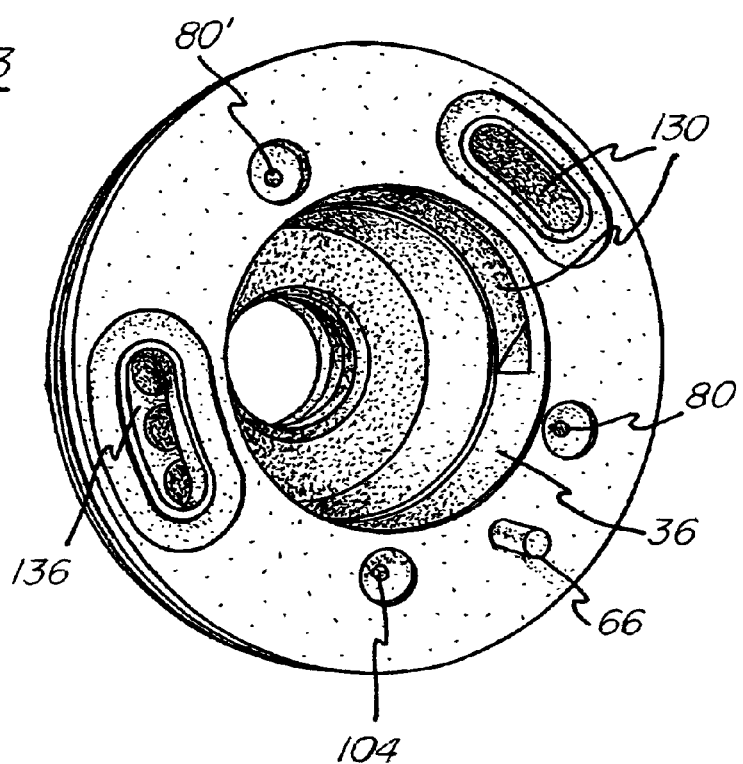
FIG. 3 is a top perspective view of the inner body of the tool assembly.
Figure 4:
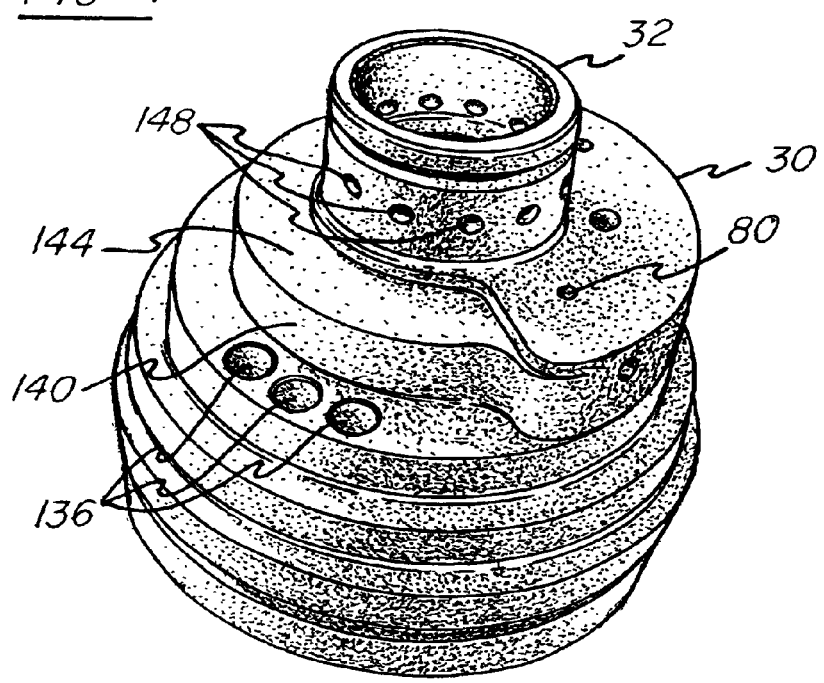
FIG. 4 is a bottom perspective view of the inner body of the tool assembly.
Figure 14:
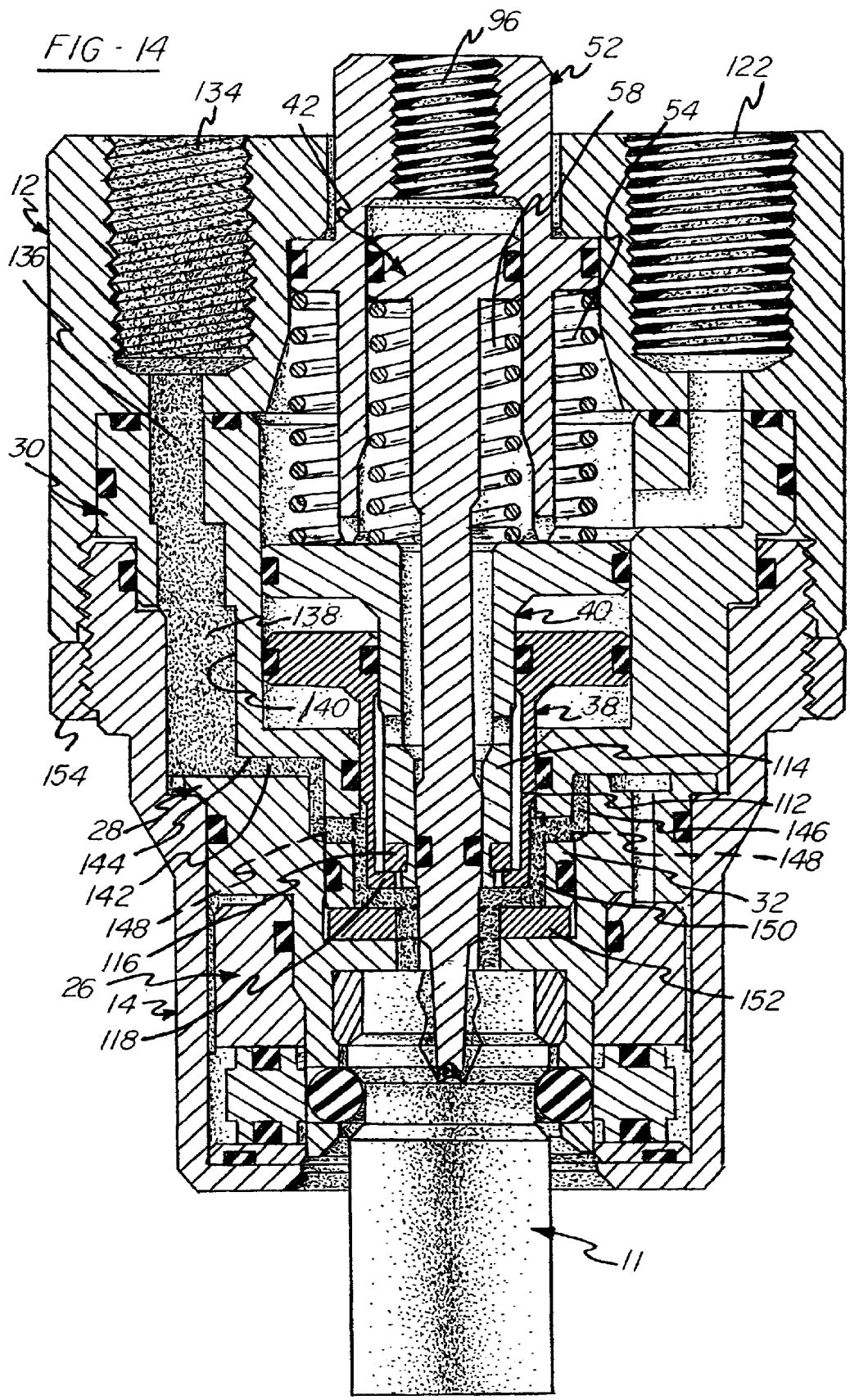
FIG. 14 is a cross sectional view taken along line A—A showing actuation of a charging fluid and movement of a fluid control poppet to provide the charging fluid to a receiving system.

Referring to FIG. 14, a charging fluid (illustrated by heavy stipling) is provided to the evacuated fluid receiving system through a fluid fill port 134 which is connected to a fluid fill passage 136 defined in the inner body 30 (see also FIGS. 3 and 4). The charging fluid is fed to a first cavity area 138 formed between a surface 140 of the inner body and an interior surface of the lower housing half 14, and subsequently enters a second cavity area 142 located between a surface 144 of the inner body 30 and an upper surface of the charge gate cylinder 28. The charging fluid then flows to a third, annular cavity area 146 extending around a portion of the lower extension 32 of the inner body adjacent an inner surface of the charge gate cylinder 28. From the annular cavity area 146, the charging fluid passes through a plurality of apertures 148 formed in the lower extension 32 of the inner body 30 to an annular cavity 150 between the cylindrical body 112 of the fluid control poppet 38 and the lower extension 32 of the inner body 30. The pressure of the charging fluid acts on the end 118 of the fluid control poppet 38 to cause the fluid control poppet 38 to move upwardly out of sealing engagement with a charge gate seal 152 against the biasing force of the spring 54.

The charging fluid will flow through the arcuate open areas 132 of the charge gate 70 until the fluid pressure applied at the port 134 is deactivated. At this time, the spring 54 will act through the vacuum control poppet 40 to bias the fluid control poppet 38 downwardly back into engagement with the charge gate seal 152. The charging operation is completed by deactivating the pressure to the stem member 42 through the stem port 52 and deactivating the clamp control air applied at port 78 whereby the activation of the Shrader valve and clamping applied at the inlet tube 11 is released to permit the tool assembly 10 to be moved out of engagement with the fluid receiving system.

It should be noted that, although not specifically referenced, O-rings are provided in a conventional manner to provide sealing between the internal valve components in order to insure fluid flow along the described paths.

Further, from the above description, it should be apparent that connection between the housing halves 12, 14 causes the internal valve components to be sealingly compressed together in sliding engagement with each other without requiring connecting fasteners between the components. It should also be apparent that the connection between the upper and lower housing halves 12, 14 may be performed by a simple twisting operation causing relative movement between the two housing halves 12, 14 to quickly engage and disengage the housing halves to each other. Also, a locking ring 154 may optionally be provided to resist disengagement of the housing halves 12, 14. Further, other engagement structures may be incorporated, other than a threaded connection, whereby the relative movement of the housing halves 12, 14 results in a positive engagement between the housing halves for containing the internal valve components.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool assembly for dispensing fluid to a fluid receiving system having a charging inlet tube, the tool assembly comprising:

a tool housing including an upper housing half and a lower housing half, said upper housing half including an upper connector portion and said lower housing half including a lower connector portion;

said lower housing half including a lower end and a clamp assembly at said lower end for coupling the tool assembly to a charging inlet tube;

said upper housing half including an upper end defining a plurality of openings for selectively admitting fluids to an interior portion of said housing;

a plurality of valve elements assembled in axially slidable engagement with each other within said upper and lower housing halves for controlling flow of fluids through said interior portion of said housing;

said upper and lower halves connected to each other at said upper and lower connector portions wherein engagement of said upper connector portion with said lower connector portion closes said housing to maintain each of said valve elements in operable relation to other ones of said valve elements.

2. The tool assembly of claim 1 wherein one of said plurality of valve elements comprises an inner body located in stationary relationship relative to said upper and lower housing halves, said inner body defining fluid passages extending through said tool housing from said upper end to said lower housing half.

3. The tool assembly of claim 2 wherein said plurality of valve elements include a vacuum control poppet and a fluid control poppet, said inner body including a cavity accommodating said vacuum control poppet and said fluid control poppet, and said vacuum control poppet and said fluid control poppet being movable in a longitudinal direction relative to each other and relative to said inner body.

4. The tool assembly of claim 3 wherein said vacuum control poppet and said fluid control poppet each include a hollow cylindrical portion and a radially extending flange extending from said cylindrical portion, and said cylindrical portion of said vacuum control poppet extends inside said cylindrical portion of said fluid control poppet.

5. The tool assembly of claim 4 wherein said inner body defines a vacuum control air passage for conveying air to an area between said poppet flanges to move said flange of said vacuum control poppet away from said flange of said fluid control poppet whereby a vacuum passage is opened between one of said openings in said upper housing half and a charging inlet tube connected to said clamp assembly.

6. The tool assembly of claim 4 wherein said inner body defines a charging fluid passage for conveying charging fluid to an area adjacent an end of said cylindrical portion of said fluid control poppet whereby pressure from charging fluid acts on said end of said cylindrical portion of said fluid control poppet to open a passage for flow of charging fluid to a charging inlet tube connected to said clamp assembly.

7. The tool assembly of claim 1 including a charge gate adjacent said lower end of said lower housing half, and a stem having an elongated shank longitudinally movable through said housing, said shank having an upper end and a lower end and a radially extending shoulder adjacent said lower end of said shank for engaging against said charge gate for limiting longitudinal movement of said stem.

8. The tool assembly of claim 1 wherein said clamp assembly comprises a clamp cylinder including a plurality of radially extending apertures, each aperture in said clamp cylinder including a piston, said pistons forming radially movable clamp members, and including an annular clamp air chamber surrounding said clamp cylinder for receiving air acting on one end of said pistons to actuate said pistons in movement through said radially extending apertures.

9. A tool assembly for dispensing fluid to a fluid receiving system having a charging inlet tube, the tool assembly comprising:

a tool housing including an upper housing half and a lower housing half;

said lower housing half including a lower end and a clamp assembly at said lower end for coupling the tool assembly to a charging inlet tube;

said upper housing half including an upper end defining a plurality of openings for selectively admitting fluids to an interior portion of said housing;

a plurality of valve elements assembled in axial engagement with each other within said upper and lower housing halves for controlling flow of fluids through said interior portion of said housing;

a charge gate located within said lower housing half adjacent said lower end and defining a passage for fluid between said tool housing and an inlet tube; and wherein one of said valve elements comprises a stem member having an upper portion and a lower portion, and said stem member supported for longitudinal movement through said tool housing to actuate a valve located in an inlet tube, said stem member including a shoulder adjacent to said lower portion for engaging against said charge gate for limiting movement of said stem member in a direction from said upper housing half toward said lower housing half.

10. The tool assembly of claim 9 wherein said upper housing half includes an upper connector portion and said lower housing half includes a lower connector portion, and said upper and lower halves are connected to each other at said upper and lower connector portions such that engagement of said upper connector portion with said lower connector portion closes said housing to maintain each of said valve elements in operable relation to other ones of said valve elements.

11. The tool assembly of claim 9 wherein said plurality of valve elements include a vacuum control poppet and a fluid control poppet, a portion of said vacuum control poppet extending through a portion said fluid control poppet and said stem member extending through said vacuum control poppet.

12. The tool assembly of claim 9 wherein said clamp assembly comprises a clamp cylinder including a plurality of radially extending apertures, each aperture in said clamp cylinder including a piston, and including an annular clamp air chamber surrounding said clamp cylinder for receiving air acting on one end of said pistons to actuate said pistons in movement through said radially extending apertures.

13. The tool assembly of claim 9 wherein one of said plurality of valve elements comprises an inner body located in stationary relationship relative to said upper and lower housing halves, said inner body defining fluid passages extending through said tool housing from said upper end to said lower housing half, and said plurality of valve elements further include a vacuum control poppet and a fluid control poppet, said inner body including a cavity accommodating said vacuum control poppet and said fluid control poppet, and said vacuum control poppet and said fluid control poppet being movable in a longitudinal direction relative to each other and relative to said inner body.

14. The tool assembly of claim 13 wherein the inner body includes a cylindrical lower extension and including an annular charging fluid chamber formed around said lower extension, and a plurality of apertures defined around the circumference of said lower extension for passage of fluid from said charging fluid chamber to said cavity in said inner body for said fluid to actuate said fluid control poppet to move within said inner body and open a fluid flow path to said charge gate.

15. A tool assembly for dispensing fluid to a fluid receiving system having a charging inlet tube, the tool assembly comprising:

a tool housing including an upper housing half and a lower housing half, said lower housing half including a lower end;

said upper housing half including an upper end defining a plurality of openings for selectively admitting fluids to an interior portion of said housing, said plurality of openings including a charging fluid inlet opening, a vacuum opening, a vacuum control air opening and a clamp control air opening;

a charge gate assembly located within said lower housing half adjacent to said lower end, said charge gate assembly including a charge gate cylinder and a clamp assembly;

said charge gate cylinder comprising an upper cavity and a lower cavity and a charge gate located between said upper and lower cavities and defining a passage for fluid between said tool housing and an inlet tube, and said charge gate cylinder including a plurality of radially extending apertures located in a wall forming said lower cavity, each said aperture containing a clamp ball for engaging an inlet tube located in said lower cavity;

said clamp assembly comprising a clamp cylinder including a plurality of apertures aligned with said apertures in said charge gate cylinder, each aperture in said clamp cylinder including a piston for engaging a respective clamp ball;

an inner body positioned on an upper end of said charge gate assembly and located in stationary relationship relative to said upper and lower housing halves, said inner body including a manifold rim at an upper end thereof and said manifold rim defining inner body passages aligned with each of said openings in said upper housing half;

one of said inner body passages comprising a vacuum passage which opens into an interior cavity of said inner body;

one of said inner body passages comprising a charging fluid passage which opens to an exterior surface of said inner body;

one of said inner body passages comprising a clamp control air passage aligned with a passage opening located on an upper surface of said charge gate cylinder;

one of said inner body passages comprising a clamp control air passage including an exit which opens into said interior cavity of said inner body;

said inner body further comprising a cylindrical lower extension extending into said upper cavity of said charge gate cylinder, and said lower extension comprising inner and outer surfaces and a plurality of radially extending apertures between said inner and outer surfaces;

a fluid control poppet comprising a cylindrical body and a radially extending flange located at an upper end thereof body wherein said cylindrical body is located inside said interior cavity of said inner body;

a vacuum control poppet comprising a cylindrical body and a radially extending flange located at an upper end thereof wherein said cylindrical body of said vacuum control poppet is located inside said cylindrical body of said fluid control poppet, said cylindrical body of said vacuum control poppet including a plurality of apertures for passage of fluid between interior portions of said vacuum control poppet and said fluid control poppet;

said exit of said clamp control air passage communicating with an annular area between an upper surface of said flange of said fluid control poppet and a lower surface of said flange of said vacuum control poppet;

a stem member supported for longitudinal movement through said tool housing and including an upper portion and a lower portion, said stem member extending through said vacuum control poppet and said lower portion extending through said charge gate, and said stem member including a shoulder adjacent to said lower portion for engaging against said gate for limiting movement of said stem member in a direction from said upper housing half toward said lower housing half;

a stem port located centrally of said upper housing half, said stem port receiving said upper portion of said stem member and defining an air passage for applying an air pressure to said upper portion of said stem member;

said upper housing half including an upper connector portion formed integrally with said upper housing half, and said lower housing half including a lower connector portion formed integrally with said lower housing half; and wherein said charge gate assembly, said inner body, said fluid control poppet, said vacuum control poppet, and said stem member comprise internal valve elements assembled in sliding engagement, and engagement of said upper connector portion with said lower connector portion closes said housing to maintain each of said internal valve elements in operable relation to other ones of said internal valve elements.

* * * * *